United States Patent [19]
Maier et al.

[11] Patent Number: 4,555,604
[45] Date of Patent: Nov. 26, 1985

[54] CIRCUIT BREAKER HAVING IMPROVED STAB ASSEMBLY

[75] Inventors: Alfred E. Maier; Louis N. Ricci, both of Chippewa Township, Beaver County, Pa.

[73] Assignee: Westinghouse Electric Corp., Pittsburgh, Pa.

[21] Appl. No.: 558,723

[22] Filed: Dec. 6, 1983

[51] Int. Cl.[4] .............................................. H01H 1/50
[52] U.S. Cl. ............................... 200/255; 339/255 P; 200/290; 200/260
[58] Field of Search .................... 339/255 P, 12 R; 200/153 G, 153 SC, 162, 163, 164 R, 245, 247, 250, 50 AA, 255, 257, 260, 282; 361/336, 341, 342, 353, 354, 356, 361

[56] References Cited

U.S. PATENT DOCUMENTS

| 2,029,028 | 1/1936 | Kneass et al. | 200/254 |
| 2,751,471 | 6/1956 | Wills | 200/254 |
| 3,180,924 | 4/1965 | Rowe | 339/22 B X |
| 3,427,419 | 2/1969 | Findley, Jr. | 200/255 |
| 3,566,335 | 2/1971 | Powell | 339/255 P X |
| 4,087,688 | 5/1978 | Nakanishi et al. | 200/254 |
| 4,121,067 | 10/1978 | Rexroad et al. | 200/50 AA |
| 4,160,142 | 7/1979 | Clausing | 200/254 |
| 4,166,205 | 8/1979 | Maier et al. | 200/153 G |
| 4,445,732 | 5/1984 | Water | 339/12 R |

Primary Examiner—Stephen Marcus
Assistant Examiner—Ernest G. Cusick
Attorney, Agent, or Firm—John Victor Pezdek

[57] ABSTRACT

A plug-in type electric circuit breaker utilizing a detachably fastened stab assembly for interconnecting the circuit breaker to current carrying members such as bus bars. The stab assembly incorporates a plurality of opposed, independently movable spring-biased contact fingers having limited axial and arcuate motion allowing for good electrical and mechanical interconnection between misaligned circuit breakers and bus bars and reduction in the amount of force required for installation while preventing the engagement of the circuit breaker with oversized or undersized conductors.

10 Claims, 6 Drawing Figures

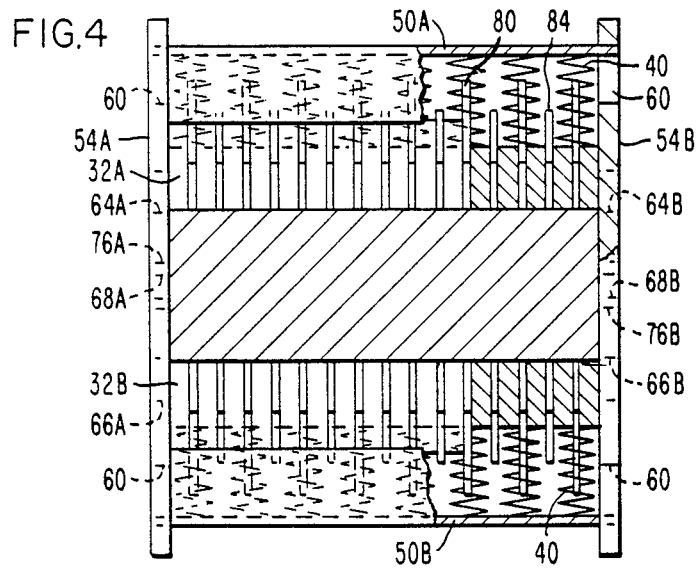
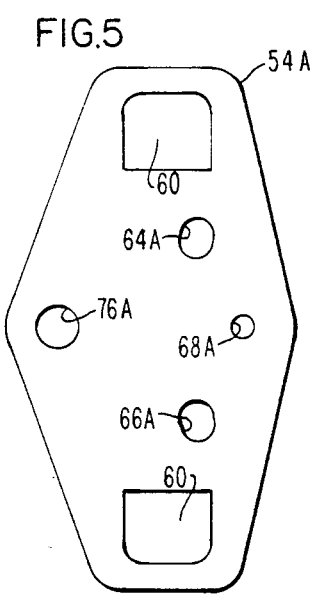
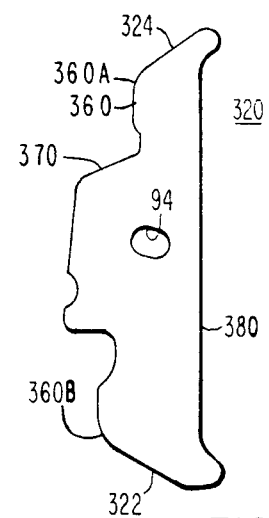

CIRCUIT BREAKER HAVING IMPROVED STAB ASSEMBLY

BACKGROUND OF THE INVENTION

In general the invention relates to electric circuit breakers and in particular the stab or contact assemblies used to detachably interconnect the circuit breaker to current carrying conductors.

Whenever electric circuit breakers, in particular plug-in type 3-pole circuit breakers, are detachably fastened to a current carrying member such as a bus bar, it is important that the stab assembly used to make the interconnection maintain good electrical and mechanical contact between the circuit breaker and the current carrying member. This avoids arcing which can damage the current carrying member, the circuit breaker or the stab assembly. In addition, the design of the stab assembly should be such as to facilitate the assembly and repair thereof.

In order to meet these criteria the stab assembly is typically provided with a plurality of opposed contact fingers which are held in a carrier or cage in a spaced apart relationship allowing for the insertion of the current carrying member and a portion of a contact of the circuit breaker therebetween. Mechanical and electrical contact of the fingers with the stationary contact and the current carrying members are maintained through the use of biasing means such as compression springs or leaf springs. One example of such an assembly can be found in U.S. Pat. No. 2,751,471 issued June 19, 1956. There a slotted C-shaped cage is used to hold a plurality of opposed contact fingers in a spaced relationship. The cage is fastened to a carrier which in turn is secured to a contact of the breaker. Compression springs are used to maintain electrical and mechanical contact of the fingers with the carrier and the current carrying member onto which the breaker is connected. The current carrying member is provided with a specially shaped engagement edge which engages the contact fingers during insertion and withdrawal allowing the contact fingers to slide across the contact surface of the carrier. The contact fingers are provided with notches which limit the amount of this sliding travel. One drawback, however, with this scheme is that the carrier and the contact current carrying member must be in substantial alignment. Another disadvantage is that the current carrying member can be overinserted into the contact assembly causing stress upon the cage assembly.

Another example of an interconnecting stab assembly is presented in U.S. Pat. No. 2,029,028 issued Jan. 28, 1936. There a single compression spring via a system of linkages is used to maintain the electrical and mechanical contact of a pair of opposed contact fingers. Although this contact assembly allows for a limited degree of axial misalignment between the current carrying member and the breaker, overinsertion of the current carrying member causing the contact fingers to lift off the surfaces of the inserted conductors and overcompression of the springs can occur. In U.S. Pat. No. 4,160,142 issued July 3, 1979 the use of modular pairs of spring biased contact fingers is illustrated. Here however as with the previous example the compression springs may be overcompressed due to the insertion of the conductors therebetween. In addition with the latter two examples of contact assemblies the inward motion of the contact fingers is limited by the design of the contact finger. In the first example this inward motion is limited by the meeting of the finger against the carrier. It would be advantageous to provide a means to control this inward motion of the contact fingers caused by the biasing means which would be independent of the contact finger. By controlling this inward motion the spacing between the contact fingers can be controlled to increase or decrease the insertion forces required.

SUMMARY OF THE INVENTION

The present invention relates to an electric circuit breaker having an improved stab assembly allowing the circuit breaker to be detachably secured to current carrying members. The circuit breaker includes a stationary contact, a movable contact operable between open and closed positions with respect to the stationary contact, a means for affecting movement of the movable contact between the open and closed positions and a support housing for securing the position of the stationary and movable contacts with respect to one another when the movable contact is in the open or closed position. Portions of the stationary contact and the movable contact are adapted to be electrically interconnected with as well as aligned with the incoming and outgoing current carrying members with stab assemblies being used to effect this interconnection. Depending upon the structure of the current carrying member to be connected to the circuit breaker, one or two stab assemblies may be required per phase. Preferably, two stab assemblies are used. Where only one stab assembly is used, it usually is connected to the stationary contact because the stationary contact is typically electrically connected to the line side or incoming current carrying member while the movable contact is connected to the load side or outgoing current carrying member.

The stab assembly includes a plurality of opposed relatively movable electrically conductive fingers with portions of the opposed faces thereof having a contact surface which is placed in contact with the portion of the contact of the circuit breaker and the current carrying members when inserted into the stab. A housing is provided for holding the opposed fingers in a spaced relationship and for aligning adjacent fingers substantially parallel with respect to one another. The housing allows limited axial and arcuate motion for each of the contact fingers with respect to the stationary contact or the current carrying member inserted in the stab. An insertion stop is provided on the housing which abuts the current carrying member when inserted into the stab to prevent the overinsertion of the current carrying member. Biasing means are disposed in the housing intermediate the ends of the contact fingers and proximate the opposite faces thereof for axially urging the opposed contact fingers toward each other thereby increasing the contact pressure of the opposed fingers upon the portions of the breaker contact and the current carrying member inserted therebetween. A pivot rod connected to the housing and positioned posterior to the insertion stop transversely extends between the opposed contact fingers. The pivot rod stops the inward axial or arcuate motion of the opposed fingers toward one another when the stab is disengaged from the current carrying member. The pivot rod also acts as a fulcrum for the rotation of the contact fingers when either the current carrying member or the breaker contact means is inserted into an empty stab. The diameter of the pivot rod controls the minimum spacing between the opposed fingers upon disconnection of the current carrying member from the stab.

By allowing the arcuate motion of the contact fingers to occur, axial misalignment between the breaker contact and the current carrying member can be permitted without affecting the electrical connection therebetween. During insertion of the breaker contact or the current carrying member, the opposed fingers are urged apart. This outward motion of the contact fingers is limited by having the opposite faces of the contact fingers seat against a portion of the housing. This prevents the overstressing of the biasing means. In addition the insertion of an oversize current carrying member is also prevented.

In one embodiment of the invention the biasing means includes a plurality of compression springs disposed between a U-shaped channel provided in the housing and the opposite faces of a pair of adjacent contact fingers. A support shim is provided intermediate the contact fingers in each pair of adjacent contact fingers and a correspondingly axially aligned opposing pair of contact fingers. The ends of the support shim extend beyond the opposite faces of the opposed pairs of contact fingers into the U-shaped channel and through the center of the compression spring. This shim is used to prevent the lateral motion of the compression spring when the stab is in a disengaged position.

In addition to the support shim a spacing shim is provided intermediate adjacent pairs of contact fingers and the corresponding axially aligned opposing pairs of contact fingers. The spacing shim and the support shim allow for the independent motion of each contact finger as well as maintaining axial alignment. The contact fingers which are used are substantially identical thus facilitating assembly and repair procedures.

BRIEF DESCRIPTION OF THE DRAWINGS

For a better understanding of the invention reference may be made to the preferred embodiments exemplary of the invention shown in the accompanying drawings.

FIG. 4 is a partial sectional view of the stab taken along line IV—IV of FIG. 3;

FIG. 5 is an illustration of the support member for the stab housing; and

FIG. 6 is an illustration of a contact finger used in the stab.

DETAILED DESCRIPTION

Figure 1:
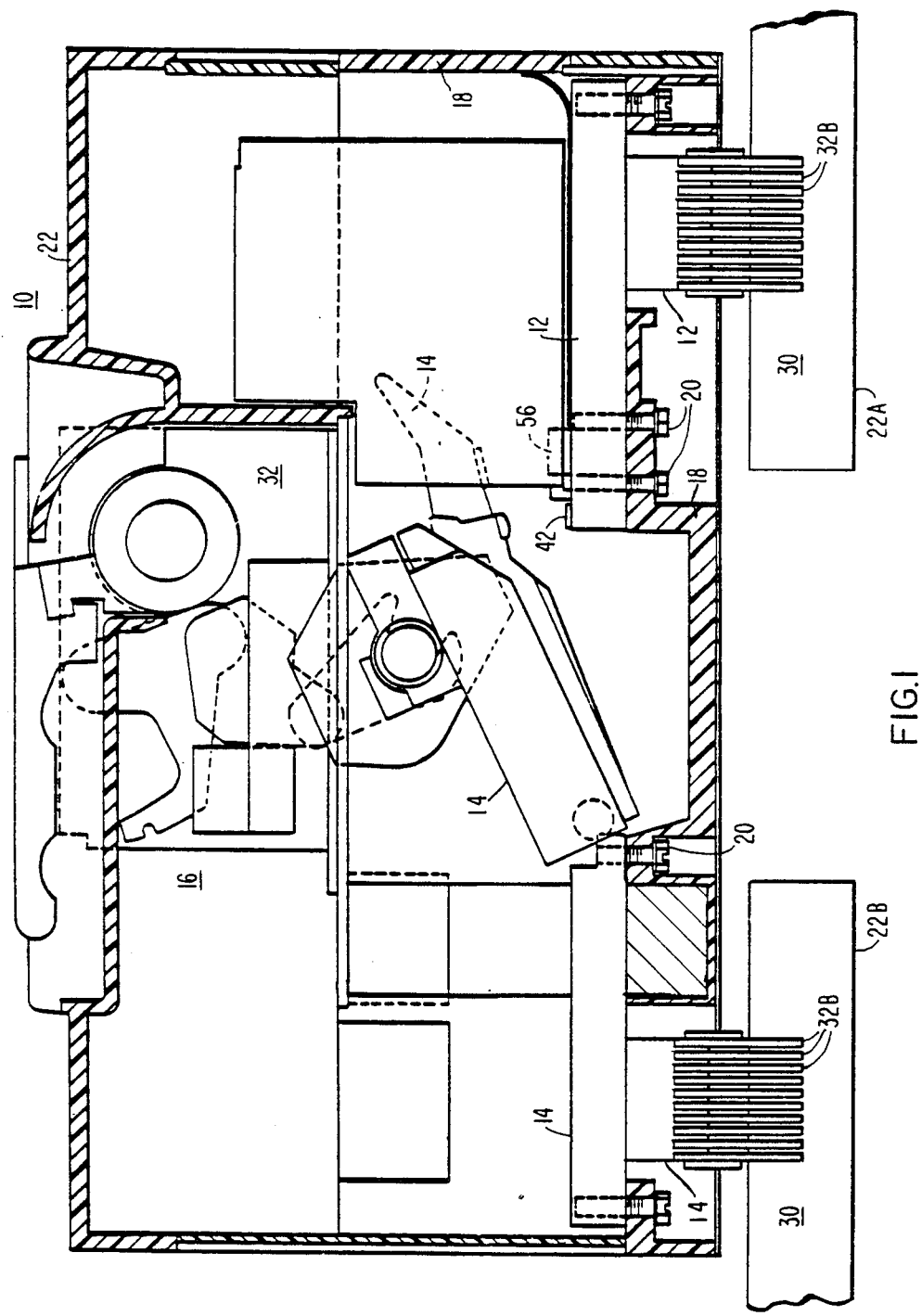
FIG. 1 is a sectional illustration of a 3-pole plug-in electric circuit breaker embodying the present invention.

In FIG. 1 an electric circuit breaker generally indicated at 10 embodying the present invention is shown. The circuit breaker 10 includes a stationary contact assembly 12 and a movable contact assembly 14 having an open and closed position with respect to the stationary contact 12. A movement affecting means generally indicated at 16 for effecting relative motion of the movable contact 14 between the open and closed positions is also provided. An insulating support 18 is secured to the stationary contact 12 and the movable contact 14 for maintaining the position of the stationary and movable contacts with respect to one another when the movable contact 14 is in either the opened or closed position. Fastening means such as screws 20 are provided to secure the contacts to the support 18. A case 22 for housing the various components is provided. The case 22 constructed of an insulating material such as plastic provides support and positioning for the contacts and movement affecting means 16. Details of these components can be found in U.S. Pat. No. 4,166,205 which is also assigned to the assignee of the present invention. When the breaker 10 is inserted in an electrical circuit preferably the stationary contact 12 is connected to the line side and the movable contact 14 is connected to the electric load. However, this is not required for proper operation of the circuit breaker.

Figure 3:
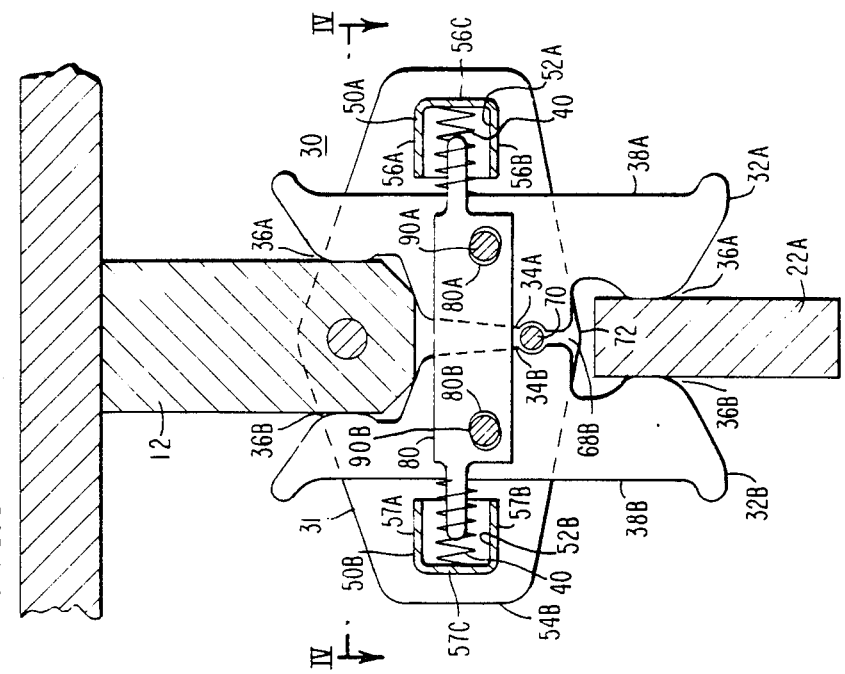
FIG. 3 is a sectional view of the stab taken along line III—III of FIG. 2.
Figure 2:
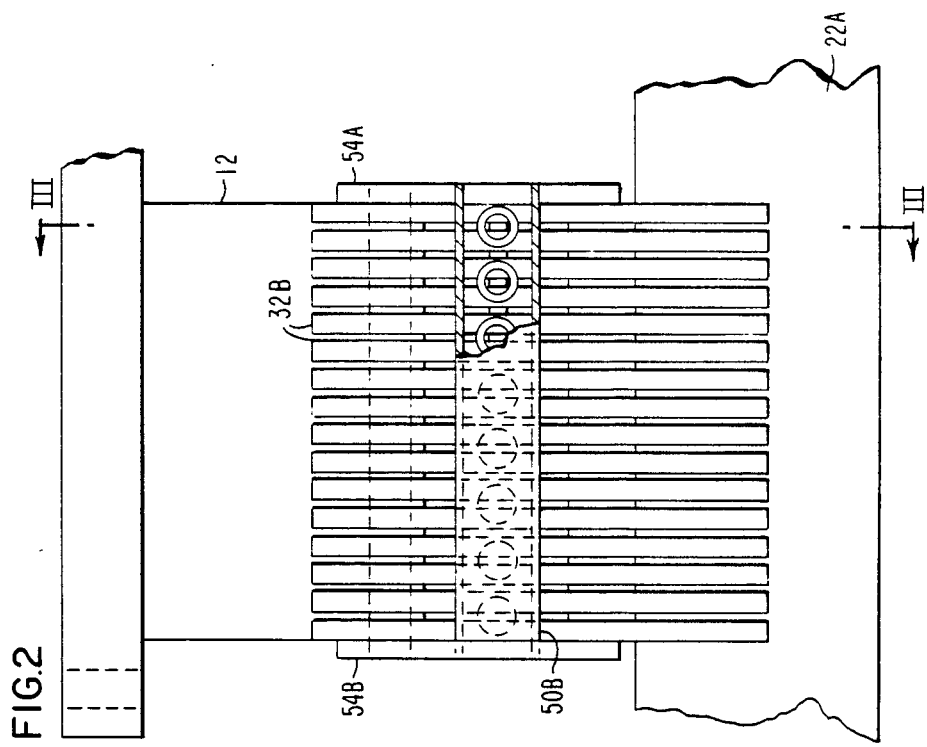
FIG. 2 is an elevational view of a stab embodying the present invention shown in the engaged position.

Referring to FIGS. 1, 2 and 3, a stab, generally indicated at 30, including a housing 31 having a plurality of opposed fingers 32A and 32B held in a spaced relationship, is used to electrically and mechanically innerconnect the stationary contact 12 and the movable contact 14 with current carrying members 22A, 22B, respectively. The current carrying member 22A and a portion of the stationary contact 12 are inserted between the opposed contact fingers 32A and 32B for engagement with the opposed faces 34A and 34B thereof. These opposed faces 34A, 34B are provided with contact surfaces 36A, 36B, respectively, to insure good electrical contact with the stationary contact 12 and the current carrying member 22A. Biasing means, preferably compression springs 40, are placed in the housing 31 about the opposite faces 38A, 38B of the contact fingers 32A, 32B, respectively, intermediate the ends of the contact fingers 32A, 32B, respectively, to urge the contact fingers 32A, 32B toward one another; thus, increasing contact pressure when the current carrying member 22A and stationary contact 12 are inserted into the stab 30. A similar arrangement exists when the movable contact 14 and a current carrying member 22B are interconnected by a stab 30.

The housing 31 for the contact fingers performs a multifunctional role in the stab assembly. Preferably, the housing 31 includes a pair of axially aligned substantially parallel end housings 50A, 50B with the opposed faces thereof each having a substantially U-shaped channel 52A, 52B, respectively, and a pair of substantially parallel support members 54A and 54B for holding the end housings 50A and 50B in a spaced relationship. Channels 52A and 52B are disposed proximate the opposite faces 38A and 38B, respectively, of the respective opposed contact fingers 32A and 32B. The ends of the channel walls 56A and 56B of channel 52A and the ends of the channel walls 57A and 57B of the channel 52B limit to the outward axial and arcuate motion of the contact fingers with respect to the stationary contact 12 or current carrying member 22 during their insertion into the stab assembly. The compression springs 40 which are used as the biasing means are positioned in both of the channels 52A and 52B and are compressed between the opposite faces 38A and 38B of the contact fingers 32A and 32B and the bases 56C and 57C of the channels 52A and 52B, respectively. The end housings 50A and 50B can be attached to the support members 54A and 54B by conventional methods such as welding or by providing appropriate openings 60 (see FIG. 5) in each through which the end housings are inserted as shown in FIGS. 2 or 4. Intermediate the attachment points of each of the end housings 50A and 50B to each of the support members 54A and 54B an opening is provided proximate each attachment point. In support member 54A these are openings 64A and 66A and in support member 54B these are openings 64B and 66B with corresponding openings in the support members being substantially aligned with respect to each other. The function of these openings will be explained hereinafter. Pivot holes 68A and 68B are also provided in each support members 54A and 54B, respectively, with the ends of the pivot rod 70 being inserted therein. Another feature of each support member is a projection 72 (see FIG. 3) extending therefrom toward the current carrying member 22A which would be inserted into the stab 30. This projection forms the insertion stop which may be in the form of a nose or as shown in FIG. 3 formed by the outward angling of the edges of the support members 54A and 54B adjacent the current carrying member. This insertion stop prevents over insertion of the current carrying member 22A into the contact stab which can cause some of the contact fingers to lift off the current carrying member.

In order to provide for the independent motion of the contact fingers with respect to one another a plurality of support shims and a plurality of spacer shims are provided in the housing 31 between adjacent contact fingers. Referring to FIG. 4, a support shim 80 is positioned intermediate the contact fingers in each pair of adjacent contact fingers and a corresponding axially aligned opposing pair of contact fingers with the ends thereof extending beyond the opposite faces of the opposed pairs of contact fingers into the U-shaped channel of each end housings 50A and 50B. As shown in FIG. 3, each support shim 80 has a pair of openings 80A and 80B, one opening in alignment with each pair of the corresponding aligned openings 64A and 64B, 66A and 66B in the support members 54A and 54B, respectively. The extended ends of the support shims 80 act as a guide and positioner for the compression springs 40 during assembly of the stab in that the springs 40 are slid over these ends. A spacing shim 84 is positioned intermediate the adjacent pairs of contact fingers and the corresponding axially aligned opposing pairs of contact fingers with each spacing shim having a pair of openings, one opening aligned with each of the corresponding aligned pairs of openings in the support members. The ends of these spacing shims can extend beyond the opposite faces of the opposed contact fingers but it is not required. With the exception of the contact fingers adjacent each of the support members, support shims and spacing shims would be alternately placed between the contact fingers preferably starting and ending with support shims. Because of the construction of the stab assembly no spacing shims or support shims are required between each support member and contact fingers adjacent to them. Neither the support shim nor the spacing shim come into direct contact with the inserted contact or conductor.

A pair of assembly pins 90A and 90B (see FIG. 3) is used to maintain the alignment of the spacing shims, the support shims and the opposed contact fingers. The assembly pins 90A and 90B pass through the aligned openings in these shims and support members as well as through a slot 94 (see FIG. 6) provided in each contact finger. The slot 94 allows for the arcuate and axial motion of each contact finger with respect to the stationary contact or the current carrying member inserted in the stab assembly. It can be seen from the figures that as either the stationary contact or the current carrying member is inserted into a totally disconnected stab that the contact fingers tend to rotate about the assembly pins 90A and 90B with the pivot rod 70 acting as the fulcrum or pivot point for the contact fingers when the first one of these is inserted into the stab 30. It will be appreciated that when both the current carrying member 22 and the stationary contact 12 are inserted in the stab 30, the opposed contact fingers are pushed apart and move toward their respective end housings. The slot 94 in each contact finger is oriented to allow the axial travel of the contact finger while still permitting the above-described arcuate motion. If the insertion of an oversize current carrying member or breaker contact is attempted, the opposite faces of the contact finger will seat against the ends of the side walls of the U-shaped channels 52A and 52B in the end housing 50A and 50B, respectively, before overcompression of the compression springs 40 can occur. When the current carrying member is removed, the compression springs 40 move the contact fingers 32A and 32B toward one another. This motion continues until a portion of the opposed faces of each of the contact fingers comes into contact with the pivot rod 70. Preferably, this portion of the opposed face of the contact fingers that comes in contact with the pivot rod may have a slight rounded indentation (as shown in FIGS. 3 and 6) to allow the contact finger to more freely pivot or rotate on the pivot rod 70. By varying the diameter of the pivot rod 70, the minimum spacing between the opposed contact fingers can be adjusted, preventing the contact fingers from pressing on an undersize conductor accidentally inserted into the stab assembly. Because the motion of each contact finger is essentially independent of the motion of adjacent fingers and the axially aligned opposing fingers, a limited amount of axial misalignment, approximately 3 to 4 degrees, between the current carrying member and the stationary contact can be accommodated without affecting the electrical connection therebetween.

Referring now to FIG. 6, each contact finger is made of an electrically conductive material and, in side view, has a generally trapezoidal shape. The inward tapering of each end 322 and 324 of each of the contact fingers from the opposite face 380 toward the contact face 360 facilitates the insertion process by acting to guide the stationary contact or the current carrying member into the stab. In the preferred embodiment of the contact fingers, an arm 370 projecting from the contact face 360 is provided. The arm 370 abuts the leading edge of the portion of the breaker contact which is inserted into the stab (see FIG. 3). This manner of engagement between the arm of each contact finger stab and the breaker contact transfers the stress of frictional forces created by the engagement of the stab with the breaker contact from the assembly pins to the stationary contact. In addition, a portion of the contact face 360 of each contact finger adjacent the current carrying member may be rounded as at 360A and 360B in order to facilitate the arcuate movement of the contact fingers when misalignment occurs between the breaker contact and the current carrying member.

Preferably the breaker contact 12 or 14 is first inserted into the stab assembly which is then detachably fastened to the breaker contact by conventional means such as a pin or screws 95 as shown in FIG. 3. Openings 76A and 76B are provided in the support members 54A and 54B, respectively, for these conventional fastening means. This is done to insure that when the circuit breaker is removed from the electrical circuit the stab assembly disconnects from the current carrying members 22A and 22B. The number of pairs of contact fingers that are required is determined by the current capacity of the breaker—the higher the capacity the greater the number of fingers required in order to conduct the current. Preferably, the stab is provided for both the stationary contact and the movable contact. While we have illustrated our invention as applied to a 3-pole circuit breaker, it is equally applicable to electric switches or interrupters of any number of poles. Further it will be obvious to those skilled in the art that various changes and modifications may be made without departing from the spirit of our invention.

We claim:

1. An electric circuit breaker for connection to one or more current carrying members, comprising:

a stationary contact;

a movable contact operable between open and closed positions with respect to the stationary contact;

movement effecting means for effecting relative movement of the movable contact between the open and closed positions;

support means secured to the stationary contact and movable contact for maintaining the position of the stationary and movable contact with respect to one another when the movable contact is in the open or closed position;

stab means for detachably and electrically interconnecting a portion of a preselected contact selected from the stationary contact or the movable contact to a portion of at least one of the current carrying members by the insertion therein of said portion of said preselected contact and said portion of said current carrying member, the stab means comprising:

a plurality of pairs of opposed, relatively movable, electrically conductive fingers, each finger having two relatively parallel faces, an opposed face and an opposite face, the opposed faces each having a contact surface placed in contact with the portions of the preselected contact and the current carrying member when each is inserted into the stab means between the opposed faces of the opposed fingers thereof;

housing means for holding the pairs of opposed fingers in a spaced relationship with respect to the inserted portions of the preselected contact and the current carrying member and aligning adjacent fingers substantially parallel with respect to one another, the housing comprising:

a pair of axially aligned substantially parallel end housings, each end housing having two relatively parallel faces, an opposed face and an opposite face, and disposed opposite one another extending across the opposed faces of the opposed fingers, the opposed faces of the end housings having a substantially U-shaped channel therein, the channel positioned proximate the opposite faces of the opposed fingers, the ends of the channel walls limiting the outward axial and arcuate motion of the fingers with respect to the inserted portions of the preselected contact and the current carrying member;

a pair of substantially parallel support members for holding the end housings in a spaced relationship, each support member having a pair of openings intermediate the end housings with an opening proximate each end housing, corresponding openings in the support members being substantially aligned with respect to each other, a pivot hole, and a projection extending therefrom toward the current carrying member forming an insertion stop intermediate the opposed fingers abutting the current carrying member when inserted into the stab means to prevent the overinsertion thereof;

a pivot rod connected to the housing means and positioned intermediate the inserted portion of the preselected contact, the insertion stop and the opposed fingers with the pivot rod extending across the space therebetween, ends of the pivots rod being inserted in the pivot holes of the support members, the pivot rod stopping the axial motion of the opposed fingers toward one another and acting as a fulcrum for the rotation of the fingers when the portion of the preselected contact is inserted into the stab means, the diameter of the pivot rod controlling the minimum spacing between the opposed fingers upon disconnection of the current carrying member from the stab means; and a pair of assembly pairs;

a plurality of support shims, a support shim intermediate the fingers in each pair of adjacent fingers and a corresponding axially aligned opposing pairs of fingers with the ends thereof extending beyond the opposite faces of the opposed pairs of fingers into the U-shaped channels of the end housings, each support shim having a pair of openings, one opening in alignment with each of the openings in the support members that are proximate the end housings;

a plurality of spacing shims, a spacing shim intermediate the adjacent pairs of fingers and the corresponding axially aligned opposing pairs of fingers, each spacing shim having a pair of openings, one opening aligning with each of the openings in the support members;

means for detachably fastening the support members of the housing means to the preselected contact when inserted into the stab means thereby assuring disconnection of the stab means from the current carrying member whenever the circuit breaker is disconnected therefrom;

biasing means disposed about the opposite faces of the opposed fingers for axially urging the opposed fingers toward each other thereby increasing the contact pressure of the opposed fingers upon the inserted portions of the preselected contact and the current carrying member, the biasing means comprising a plurality of compression springs, one spring disposed about each end of each support shim, the springs being compressed between the base of the U-shaped channels in the end housings and the opposite faces of the fingers adjacent each support shim, the fully compressed length of each spring being less than the depth of the U-shaped channel thereby avoiding the overcompression thereof caused by the outward axial or arcuate motion of the fingers with the ends of the support shims preventing lateral motion of the springs with respect to the opposite faces of the opposed fingers; and each finger having a slot, the slots of the adjacent fingers aligning with the openings in the adjacent support shims and spacing shims so that the assembly pins can be inserted therethrough for assembling the stab means, the slot in each finger allowing arcuate and axial motion of the finger with respect to the inserted portions of the preselected contact and the current carrying member with the support shims and spacing shims allowing for the independent arcuate and axial motion of each finger.

2. The circuit breaker as described in claim 1 wherein each of the opposed fingers further includes an arm projecting from the opposed face, the arm abutting the portion of the preselected contact inserted between the opposed fingers thereby transferring the stress of frictional forces created by the engagement of the stab means with the inserted portion of the current carrying member from the assembly pins to the inserted portion of the preselected contact.

3. The circuit breaker as described in claim 2 wherein a portion of the stationary contact is the preselected contact inserted into the stab means.

4. The circuit breaker as described in claim 3 wherein a portion of the movable contact is the preselected contact inserted into the stab means.

5. An electric circuit breaker for connection to one or more current carrying members, comprising:
   a stationary contact;
   a movable contact operable between open and closed positions with respect to the stationary contact;
   movement effecting means for effecting relative movement of the movable contact between the open and closed positions;
   support means secured to the stationary contact and movable contact for maintaining the position of the stationary and movable contact with respect to one another when the movable contact is in the open or closed position;
   stab means for detachably and electrically interconnecting a portion of a preselected contact selected from the stationary contact or the movable contact to a portion of at least one of the current carrying members by the insertion therein of said portion of said preselected contact and said portion of said current carrying member, the stab means comprising:
   a plurality of pairs of opposed, relatively movable, electrically conductive fingers, each finger having two relatively parallel faces, an opposed face and an opposite face, the opposed faces each having a contact surface placed in contact with the portions of the preselected contact and the current carrying member when each is inserted into the stab means between the opposed faces of the opposed fingers thereof;
   housing means for holding the pairs of opposed fingers in a spaced relationship with respect to the inserted portions of the preselected contact and the current carrying member and aligning adjacent fingers substantially parallel with respect to one another, the housing means including:
   means for allowing limited axial and arcuate motion for each of the fingers with respect to the inserted portions of the preselected contact and the current carrying member;
   an insertion stop intermediate the opposed fingers abutting the current carrying member when inserted into the stab means to prevent the overinsertion thereof; and
   biasing means disposed about the opposite faces of the opposed fingers for axially urging the opposed fingers toward each other thereby increasing the contact pressure of the opposed fingers upon the inserted portions of the preselected contact and the current carrying member; and
   a pivot rod connected to the housing means and positioned intermediate the inserted portion of the preselected contact, the insertion stop and the opposed fingers with the pivot rod extending across the space therebetween, the pivot rod stopping the axial motion of the opposed fingers toward one another and acting as a fulcrum for the rotation of the fingers when the portion of the preselected contact is inserted into the stab means, the diameter of the pivot rod controlling the minimum spacing between the opposed fingers upon disconnection of the current carrying member from the stab means.

6. The circuit breaker as described in claim 5 wherein the stab means further comprises:
   the housing means comprising:
   a pair of axially aligned substantially parallel end housings, each end housing having two relatively parallel faces, an opposed face ends an opposite face, and disposed opposite one another extending across the opposite faces of the opposed fingers, the opposed faces of the end housings having a substantially U-shaped channel therein, the channel positioned proximate the opposite faces of the opposed fingers, the ends of the channel walls limiting the outward axial and arcuate motion of the fingers with respect to the inserted portions of the preselected contacts and the current carrying member;
   a pair of substantially parallel support members for holding the end housings in a spaced relationship, each support member having a pair of openings intermediate the end housings with an opening proximate each end housing, corresponding openings in the support member being substantially aligned with respect to each other, a pivot hole into which an end of the pivot rod is inserted, and a projection extending therefrom toward the current carrying member forming the insertion stop;
   a pair of assembly pins;
   a plurality of support shims, a support shim intermediate the fingers in each pair of adjacent fingers and a corresponding axially aligned opposing pair of fingers with the ends thereof extending beyond the opposite faces of the opposed pairs of fingers into the U-shaped channels of the end housings, each support shim having a pair of openings, one opening in alignment with each of the openings in the support members that are proximate the end housings;
   a plurality of spacing shims, a spacing shim intermediate the adjacent pairs of fingers and the corresponding axially aligned opposing pairs of fingers, each spacing shim having a pair of openings, one opening aligning with each of the openings in the support members;
   means for detachably fastening the support member of the housing means to the preselected contact when inserted into the stab means thereby assuring disconnection of the stab means from the current carrying member whenever the circuit breaker is disconnected therefrom;
   the biasing means comprising a plurality of compression springs, one spring disposed about each end of each support shim, the springs being compressed between the base of the U-shaped channels in the end housings and the opposite faces of the fingers adjacent each support shim, the fully compressed length of each spring being less than the depth of the U-shaped channel thereby avoiding the overcompression thereof caused by the outward axial or arcuate motion of the fingers with the ends of the support shims preventing lateral motion of the springs with respect to the opposite faces of the opposed fingers; and each finger having a slot, the slots of the adjacent fingers aligning with the openings in the adjacent support shims and spacing shims so that the assembly pins can be inserted therethrough for assembling the stab means, the slot in each finger allowing arcuate and axial motion of the finger with respect to the inserted portions of the preselected contact and the current carrying member with the support shims and spacing shims allowing for the independent arcuate and axial motion of each finger.

7. The circuit breaker as described in claim 6 wherein each of the opposed fingers further includes an arm projecting from the opposed face, the arm abutting the portion of the preselected contact inserted between the opposed fingers thereby transferring the stress of frictional forces created by the engagement of the stab means with the inserted portion of the current carrying member from the assembly pins to the inserted portion of the preselected contact.

8. The circuit breaker as described in claim 7 wherein a portion of the stationary contact is inserted into the stab means.

9. The circuit breaker as described in claim 7 wherein a portion of the movable contact is inserted into the stab means.

10. A contact stab assembly for interconnecting portion of a contact in an electric circuit breaker to a current carry member, comprising:

a plurality of pairs of opposed, relatively movable, electrically conductive fingers, each finger having two relatively parallel faces, an opposed face and an opposite face, the opposed faces each having a contact surface placed in contact with the portions of the contact and the current carrying member when each is inserted into the stab means between the opposed faces of the opposed fingers thereof;

housing means for holding the pairs of opposed fingers in a spaced relationship with respect to the inserted portions of the contact and the current carrying member and aligning adjacent fingers substantially parallel with respect to one another, the housing means comprising:

a pair of axially aligned substantially parallel end housings, each end housing having two relatively parallel faces, an opposed face and an opposite face, and disposed opposite one another extending across the opposite faces of the opposed fingers, the opposed fingers of the end housings having a substantially U-shaped channel therein, the channels positioned proximate the opposite faces of the opposed fingers, the ends of the channel walls limiting the outward axial and arcuate motion of the fingers with respect to the inserted portions of the contact and the current carrying member;

a pair of substantially parallel support members for holding the end housings in a spaced relationship, each support member having a pair of openings intermediate the end housings with an opening proximate each end housing, corresponding openings in the support members being substantially aligned with respect to each other, a pivot hole, and a projection extending therefrom toward the current carrying member forming an insertion stop intermediate the opposed fingers abutting the current carrying member when inserted into the stab means to prevent the overinsertion thereof;

a pivot rod connected to the housing means and positioned intermediate the inserted portion of the contact, the insertion stop, and the opposed fingers with the pivot rod extending across the space therebetween, ends of the pivots rod being inserted in the pivot holes of the support members, the pivot rod stopping the axial motion of the opposed fingers toward one another and acting as a fulcrum for the rotation of the fingers when the portion of the contact is inserted into the stab means, the diameter of the pivot rod controlling the minimum spacing between the opposed fingers upon disconnection of the current carrying member from the stab means; and a pair of assembly pins;

a plurality of support shims, a support shim intermediate the fingers in each pair of adjacent fingers and a corresponding axially aligned opposing pairs of fingers with the ends thereof extending beyond the opposite faces of the opposed pairs of fingers into the U-shaped channels of the end housings, each support shim having a pair of openings, one opening in alignment with each of the openings in the support members that are proximate the end housings;

a plurality of spacing shims, a spacing shim intermediate the adjacent pairs of fingers and the corresponding axially aligned opposing pairs of fingers, each spacing shim having a pair of openings, one opening aligning with each of the openings in the support members;

means for detachably fastening the support members of the housing means to the contact when inserted into the contact stab thereby assuring disconnection of the contact stab from the current carrying member whenever the circuit breaker is disconnected therefrom;

biasing means disposed about the opposite faces of the opposed fingers for axially urging the opposed fingers toward each other thereby increasing the contact pressure of the opposed fingers upon the inserted portions of the contact and the current carrying member, the biasing means comprising a plurality of compression springs, one spring disposed about each end of each support shim, the springs being compressed between the base of the U-shaped channels in the end housings and the opposite faces of the fingers adjacent each support shim, the fully compressed length of each spring being less than the depth of the U-shaped channel thereby avoiding the overcompression thereof caused by the outward axial or arcuate motion of the fingers with the ends of the support shims preventing lateral motion of the springs with respect to the opposite faces of the opposed fingers; and each finger having a slot, the slots of the adjacent fingers aligning with the openings in the adjacent support shims and spacing shims so that the assembly pins can be inserted therethrough for assembling the stab means, the slot in each finger allowing arcuate and axial motion of the finger with respect to the inserted portions of the contact means and the current carrying member with the support shims and spacing shims allowing for the independent arcuate and axial motion of each finger.

* * * * *